United States Patent [19]
Schudel et al.

[11] 3,840,208
[45] Oct. 8, 1974

[54] BUBBLE-TIGHT INFLATABLE SEAL FOR BUTTERFLY VALVE WITH OFFSET DISC

[76] Inventors: Arthur Schudel, 4497 Edmond Dr., South Euclid, Ohio 44121; Robert B. Rodwancy, 3737 N. Karwood Dr., Port Clinton, Ohio 43452

[22] Filed: May 10, 1973

[21] Appl. No.: 359,064

[52] U.S. Cl. .................. 251/30, 251/173, 251/306
[51] Int. Cl. .......................................... F16k 1/226
[58] Field of Search ............ 251/30, 173, 175, 306; 137/375

[56] References Cited
UNITED STATES PATENTS

| | | | |
|---|---|---|---|
| 1,834,988 | 12/1931 | White | 251/173 |
| 2,705,016 | 3/1955 | Saar | 251/173 X |
| 2,911,184 | 11/1959 | Moore | 251/173 |
| 3,630,674 | 2/1972 | Forst | 137/375 |

*Primary Examiner*—Harold W. Weakley
*Attorney, Agent, or Firm*—Cain and Lobo

[57] ABSTRACT

An off-set disc pivotally mounted in a butterfly valve body is pivotable from an open position to a bubble-tight or leak-proof, closed position. A continuous, integral inflatable seal having opposed inwardly concave sides is disposed within the valve body in sealing relationship with the periphery of the disc by a unique seal-retaining means which permits no leakage of gas and easy replacement of the seal. The inflatable seal is secured between a pair of spaced-apart annular rings by friction between mating portions of the rings and the seal. When not inflated the seal may be removed from between the rings simply by pulling it out. Means are provided for inflating the seal to a predetermined pressure.

6 Claims, 6 Drawing Figures

BUBBLE-TIGHT INFLATABLE SEAL FOR BUTTERFLY VALVE WITH OFFSET DISC

BACKGROUND OF THE INVENTION

It is conventional practice to seal adjacent surfaces of a valve against fluid flow thenbetween by means of a resilient member, positioned between, and in engagement with, each of the surfaces. It is also conventional practice to provide a groove in one of the surfaces to house the resilient member and thus retain it in its sealing position when the valve is closed. It is just as important that the resilient member be retained in position when the valve is fully open, or partially open. Quite naturally therefore, means for retaining a resilient seal have been developed to which means the seal is permanently affixed, and which permit an absolute minimum of movement consistent with the proper functioning of the valve. Unfortunately, as a direct result of the emphasis on a maximum security retaining means, replacing a sealing member securely permanently housed in prior art devices, is a most time-consuming and therefore expensive task. Moreover the replacement seal may be no more reliable and thus the task might also be unrewarding.

For example, where an annular seal is retained in a groove provided in the housing or valve-body of a butterfly valve, the periphery of the valve's disc is sealed circumferentially against the seal to impede fluid flow when the disc is in the closed position. Simple as this seems in theory. conventional valves of this kind are afflicted with numerous shortcomings depending upon the specific type of valve, its shape and size, and the pressure and temperature conditions at which it operates.

Though the seal of this invention is formed of a resilient material, it is a continuous, integral inflatable seal adapted to be inflated to a pressure in excess of the pressure within the duct in which the valve is used. In this sense an integral inflatable seal is distinguished from other resilient, annularly disposed seals; a more important distinction is that inflatable seals are more prone to being dislodged because of the combined internal and external pressure variations to which they are routinely subjected. For example, in most applications, an inflatable seal will be inflated for sealing in a closed position, and deflated when the valve is opened, over and over again. It may therefore be expected to be more likely to be dislodged, and more likely to leak than other resilient seals.

Consequently, manufacturers of integral inflatable seals specify machining details for each groove type, which groove is particularly designed to retain a certain seal cross-section (see Bulletin entitled "Inflatable Seals" by B. F. Goodrich Co.).

By "integral inflatable seal" we refer to inflatable seals of the tube type, such as those commercially available from the bulletin referred to hereinabove. Preferred seals are those wherein a fabric-reinforced rubber tube made of an elastomeric material and molded with its sealing portion in a retracted or collapsed position. Low pressure inflation is sufficient to inflate the seal. By "continuous" is meant that the seal is a closed loop, free of breaks in the sealing surface, or that it may be formed into a closed loop, for example by coupling the ends with a sleeve which will not affect the sealing surface.

The problem of ineffective sealing is particularly acute with large, butterfly valves of circular cross-section having a diameter in excess of about 12 ins. Even with relatively larger dimensions, it is not unusual to require that the butterfly valve be capable of bubble-tight shut-off. Particularly where gas pressures in the duct are relatively low, that is, less than about 25 psig, this requirement is common, that is, the valve must be capable of effecting a gas-tight seal against the gas pressure in the duct so that no gas leaks around the disc. This capability of a bubble-tight seal is conventionally tested by providing a water-seal on the downstream side of the disc, with the edge of the disc sealed against the inflatable seal so as to be in the closed position, and determining whether any bubbles are formed. Hence the expression "bubble-tight."

Moreover, it is generally required that when an inflatable seal is to be replaced, for example, because of wear on the seating surface, accidental damage, or because a different seal material is to be used, the replacement is to be effected within a brief predetermined time period to minimize down-time for the duct in which the valve is installed, and of related portions of a process which depend upon gases from the duct.

This invention is directed to solving the twin problems of ineffective sealing and unduly long and difficult replacement procedures to which prior art inflatable seal valves are subject.

U.S. Pat. No. 3,638,674 discloses a gastight damper having an inflatable seal with a sealing surface which is sufficiently pliable to be responsive to changes of pressure within a chamber defined by a portion of the wall of the duct, a pair of seal-mounting rings and the sealing surface. A tubular ring is used to provide a seating surface, and the tubular ring is fixedly attached to, and offset from the disc or blade member. The tubular ring provides a relatively large arcuate surface upon which the flexible sealing surface is embracingly forced. This relatively large circumferentially concave contact surface between the ring and the sealing surface effects the desired inflatable but non-integral seal.

SUMMARY OF THE INVENTION

It is therefore a general object of this invention to provide a new and improved sealing means including an integral inflatable seal for a casing, housing, duct defining an opening of arbitrary cross-section or butterfly valve having a disc means which together with a unique retaining means effects a bubble-tight shut-off.

It is another general object of this invention to provide a new and improved simple retaining means in which an integral inflatable seal may be frictionally secured and easily removably disposed.

It is a specific object of this invention to provide a valve having a disc means for controlling flow and a retaining means for an integral continuous inflatable seal or casing which utilizes a pair of rod members fixedly disposed upon the inner wall of the valve body in spaced-apart relationship, thus obviating the conventional need for machining a suitable groove for the seal.

It is another object of this invention to provide a reliable and inexpensive retaining means for frictionally securing an integral continuous inflatable seal for a butterfly valve having a diameter in excess of about 12 ins., which valve is required to have a bubble-tight shut-off.

It is more a specific object of this invention to provide an integral inflatable seal of a particular shape which is adapted to be removably secured by a pair of spaced-apart annularly disposed rings formed by rod members having an arcuate cross-section adapted to secure this shape.

It is still another specific object of this invention to provide an easily replaceable integral inflatable seal securely retained by a pair of spaced-apart rings so as to effect, when the seal is inflated, a bubble-tight or leak-proof shut-off against transversely flowing gases having a pressure less than about 150 psig.

It is yet another object of this invention to provide a retaining means comprising a pair of annular rings which may be welded into a rolled valve body of a large butterfly valve with a minimal risk of distortion, either during welding or after the valve is placed in operation.

These and other objects, features and advantages of this integral inflatable seal and the retaining means in which it is removably secured in a butterfly valve with an off-set disc, so as to provide a bubble-tight shut-off, will become apparent to those skilled in the art from the following description of preferred forms thereof, reference being had to the accompanying drawings.

DETAILED DESCRIPTION OF A PREFERRED EMBODIMENT

Figure 1:
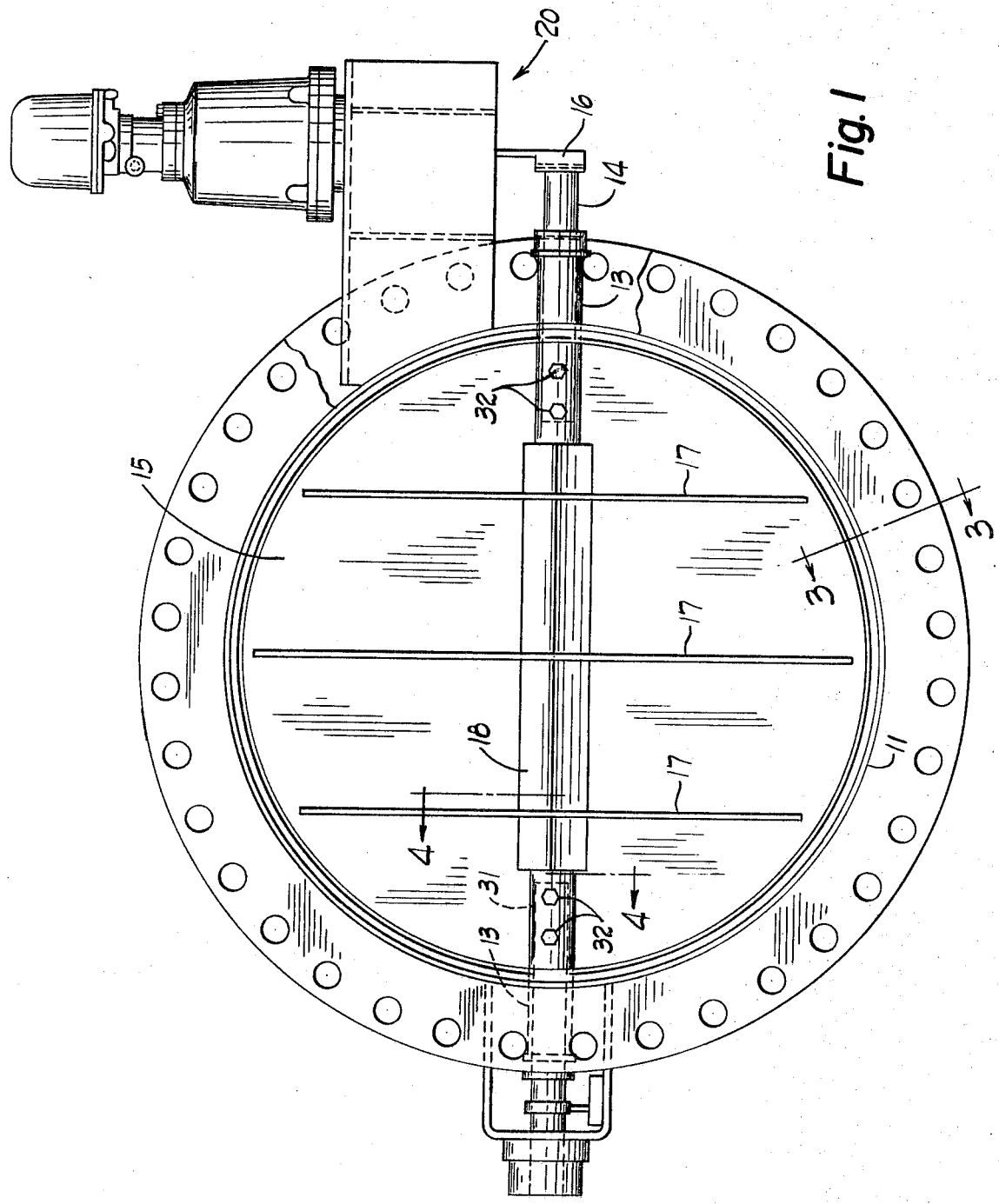
FIG. 1 is an end view of a butterfly valve including an off-set circular disc in circumferentially sealed-relationship with the integral inflatable seal housed in the retaining means described herein.

Referring more particularly to the drawings, wherein like numerals indicate like parts, there is illustrated in FIG. 1 a butterfly valve indicated generally at 10, having a cylindrical valve body or casing 11. It will be apparent from the description herein that it is not essential that the sealing means of this invention be limited to a valve body or casing of a butterfly valve but may be used in any casing or duct of arbitrary cross-section, adapted to accomodate a valve-disc means or damper assembly for the purpose of controlling the flow of gas through the duct.

It has been mentioned hereinbefore that this invention is particularly directed to those applications where it is necessary to effect a bubble-tight shut-off with a butterfly valve, irrespective of its size, when the gas pressure against which the valve is to be shut-off is less than about 50 lbs/sq. in. gauge. This invention is more particularly directed to controlling the flow in relatively large ducts, in excess of about 1 foot in diameter, in which the gas pressure is preferably less than about 25 psig, and which is required to be shut off with no gas leakage around the shut-off valve. The temperature at which the valve and sealing means of this invention is effective depends on the material of the integral inflatable seal and the distortion characteristics of the valve body and disc. In general this combination of valve and sealing means is effective at a temperature below that which is deleterious to the elastomeric material used to make the continuous, integral inflatable seal. Typical materials used are natural rubber, butyl, Hycar, Neprene, EPDM or silicone, the choice depending upon the operating temperature range and the duration of high temperature operation, the type of atmosphere surrounding the seal, the pressure differential between the inflation pressure and the duct pressure, and cycle frequency. For additional strength, the inflatable seal is reinforced with fabric such as nylon, Nomex, or Dacron, coated with a polymer.

Figure 2:
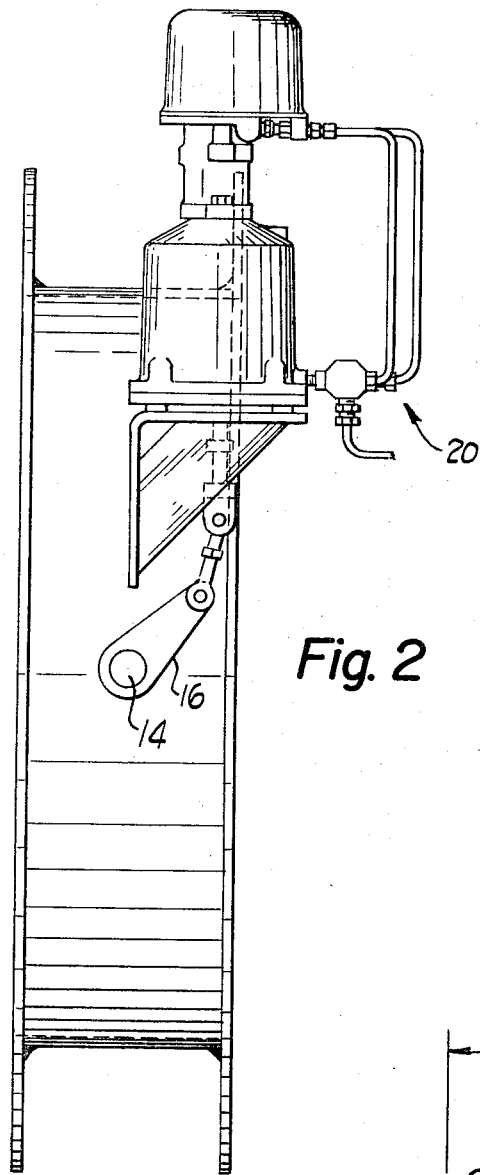
FIG. 2 is a side elevation view of the butterfly valve showing means for automatically opening and closing the disc.

The valve body 11 may be of any suitable cross section, and in most ducts, is either cylindrical or rectangular. For relatively large diameters in excess of 12 inches and particularly those in excess of about 2 feet, the valve body 11 may include reinforcing flanges 12. The valve body 11 is provided with a pair of oppositely disposed bores 13 which slidingly accommodate a shaft 14 rotatably disposed therein. Conventionally, the bore 13 is provided with a bushing, packing material, spacers (not shown) and the like which sealingly cooperate with the shaft 14 to prevent leakage of gas therearound, and which need not be discussed. An off-set disc means 15 is fixedly disposed on the shaft 14 as will be described hereinafter. One end of the shaft 14 protrudes from the valve body 11 and is operatively connected, as seen in FIG. 2, for example by a linkage means 16 to an operator means, indicated generally at 20, which may be manual or which may automatically position the disc 15 at any desired setting. Any automatic operator means including hydraulically and electrically powered types may be used, but the pneumatically actuated type including a 3-way solenoid in a conventional, electrically controlled system, is preferred. Suffice that the operator means be capable of positioning the disc accurately, relative to the valve body, particularly in the closed position.

Figure 4:
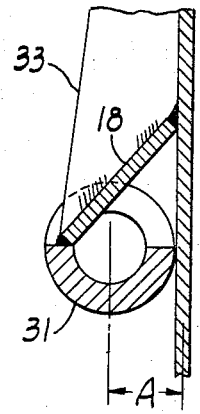
FIG. 4 is an enlarged detailed sectional view, partially broken away, taken along the line 4—4 of FIG. 1.
Figure 3:
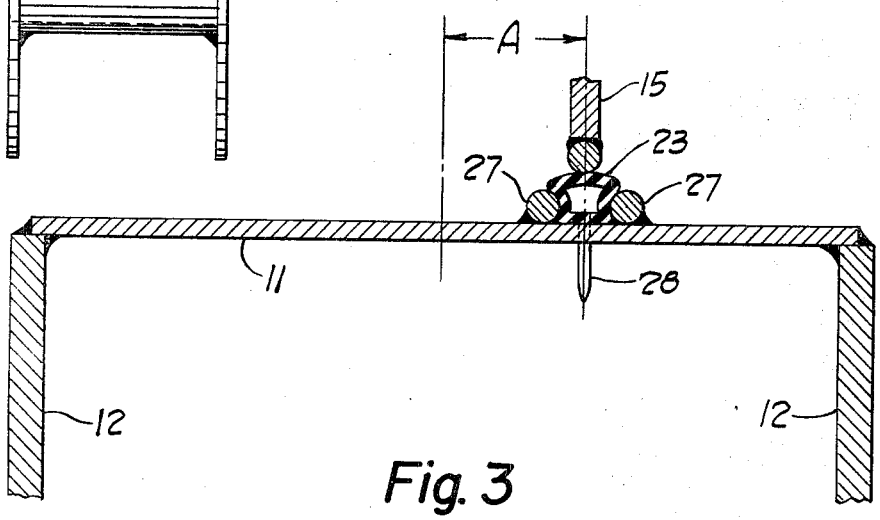
FIG. 3 is an enlarged detailed sectional view taken along the line 3—3 of FIG. 1.

The disc means 15 may include vertical stiffeners 17 and a horizontal stiffener 18, such as lengths of angle iron welded to the disc, as shown in FIGS. 1 and 4. The center line of the disc is spaced from the center line of the shaft, the center lines being longitudinally offset by the dimension A (FIGS. 3 and 4). The dimension A is so chosen that the shaft 14 does not interfere with an inflatable sealing member 23, also referred to herein as a 'seal,' for convenience. The edge of the disc 15 is the surface which sealingly presses against the sealing surface of the seal when the disc is in the closed position.

Figure 6:
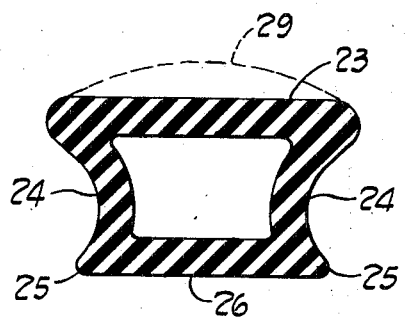
FIG. 6 is a vertical cross-sectional end view of a particular continuous, integral inflatable seal.

The inflatable seal 23 is continuous and integral, and is disposed within the valve body 11, peripherally, upon the inner wall of the valve body, to form a leak-proof bubble-tight seal between the upstream and downstream sides of the butterfly valve when the disc 15 is in the closed position, and the seal 23 is inflated. The inflatable seal of this invention has a specific and unique configuration of its sides which are "pinched in" and a sealing surface which is convex when the seal is inflated. As is best illustrated in FIG. 6, the particular type of inflatable seal used herein has inwardly concave sides 24 each with a radius 25 near the base 26. The radii 25 are adapted to snugly fit a pair of annular retaining rings 27. The rings 27 are spaced apart parallel relationship with each other along the longitudinal axis of the valve body. The rings 27 are fixedly disposed upon the inner wall of the valve body 11 (see FIG. 3). Each annular ring may be spot-welded to the inner wall to maintain the pair in parallel spaced-apart relationship, but it is preferred to weld at least the upstream ring continuously to minimize the risk of gas leakage under the ring and around the seal 23. A fluid connection 28 is provided through the wall of the valve body, in selective fluid communication with a source of superatmospherically pressurized fluid to inflate the seal retained by the annular rings 27. Where the duct gases are at a pressure below atmospheric pressure, a source of fluid below atmospheric pressure, but sufficient to inflate the seal, will suffice.

A fluid, preferably pressurized air, is supplied to the connector 28, during inflation of the inflatable seal, from any convenient source such as a pressurized cylinder. Whether the inflatable seal is in its normal uninlfated form or it is in its inflated form, as shown by the phantom outline of its convex sealing surface 29, (FIG. 6), the retaining rings 27 effect a secured frictional retention of the seal in its proper position.

The annular rings 27 may be formed of rods with circular cross-section having a diameter less than the height of the seal in its normal un-inflated position and preferably less than the width of the base of the seal. Typically the rods may be 7/16 inch dia. and the height of the seal in its un-inflated position is 0.60 in. It is not essential that the rods be circular in cross-section provided opposed inner surfaces of the pair of rings match the inwardly concave sides of the seal in such a manner as to effect a frictional fit which does not permit the seal to be 'blown out' of or dislodged from the retaining means.

The disc means 15 is preferably fixedly disposed on the shaft 14, as is illustrated in FIGS. 1 and 4, by means of a tube 31 welded along the horizontal diameter of the disc 15, so as to provide ample support for the shaft within the tube. Fastening means, such as bolts 32 secure the shaft within the tube 31 so that an angular displacement of the shaft 14 rotates the disc 15 from an open to a closed position, or vice versa, or any position in-between.

It will be noted that the continuous, integral inflatable seal is positioned in such a manner, that with the disc 15 in the closed position, the entire periphery of the disc sealingly abuts the sealing surface 29; and with the disc in the open position, the disc may lightly abut the uninflated seal at opposite sides of it, just near the ends of the tube 31. It is preferred to open or close the valve with the inflatable seal 23 in the uninflated attitude, mainly to minimize wear on the seal, but with relatively low internal seal pressures, say less than about 10 lbs./sq. in. gauge, the disc may be opened and closed without depressuring the seal 23. To obtain a buble-tight seal the disc means 15 is moved into the closed position preferably with the seal uninflated, and the seal is inflated under an internal seal pressure sufficiently greater than the duct pressure, to effect the desired seal. Internal seal pressures up to about 150 psig. may be used if necessary, but it will be found that with relatively low duct pressures less than about 25 psig., an internal seal pressure of 35 psig will suffice to effect a buble-tight shut-off.

Figure 5:
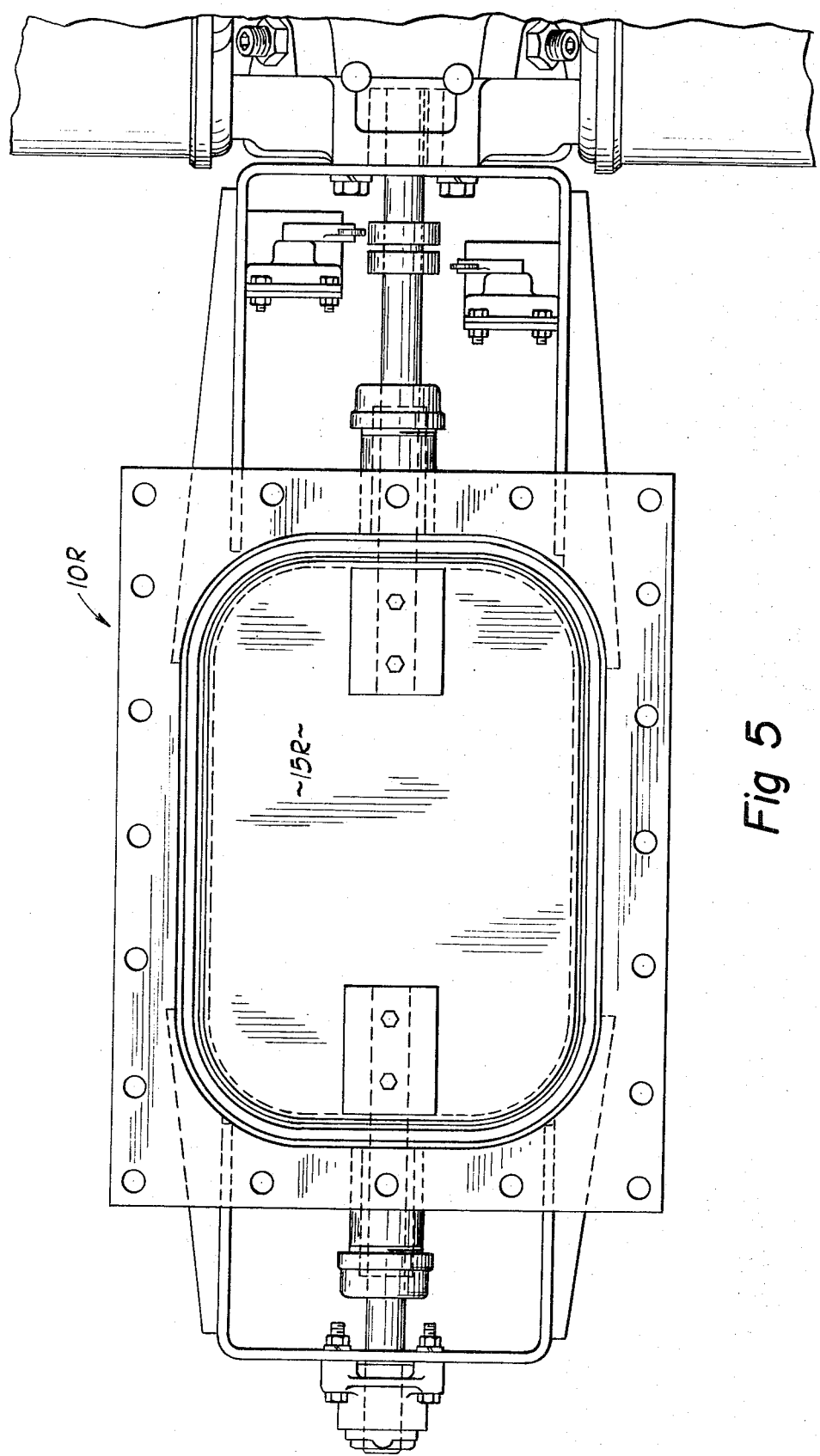
FIG. 5 is an end view of a butterfly valve including an off-set generally rectangular disc in circumferentially sealed relationship with the integral inflatable seal housed in the retaining means described herein.

Quite surprisingly, the simple expedient of providing a pair of annular rings with inner surfaces matched to sealingly mate with the inwardly concave sides of this continuous, integral inflatable seal, not only frictionally secures the seal during operation of the disc, but permits easy replacement of the seal merely by pulling out the old one and pressing in a new seal. More surprisingly, this combination of a unique seal retained by a pair of annular rings, permits even a rectangular disc 15R (such as is shown in FIG. 5) of a rectangular butterfly valve 10R to be shut-off without gas leak. In a similar manner, any conventional butterfly valve, casing or duct having an opening of arbitrary cross-section may be adapted for use in accordance with the teachings of this invention, the size of the valves so adapted being limited only by the ability of the valve body or casing to withstand deformation and distortion during use. Valves 4 ft. in diameter are presently being fabricated satisfactorily, and the low level of maintenance on the valves due to sealing problems has been most encouraging. A proper choice of materials of construction, depending upon the service environment, will help to further decrease maintenance; for example, stainless steel annular rings provide excellent dimensional stability.

Modifications, changes and improvements to the preferred forms of the invention herein disclosed, described and exemplified, may occur to those skilled in the art who come to understand the principles and precepts thereof. Accordingly the scope of the patent to be issued herein, should not be limited to the particular embodiments of the invention set forth herein above, but rather, by the advance of which the invention has promoted the art.

What is claimed is:

1. In a butterfly valve to control the flow of gas in a duct, said valve including a valve body having oppositely disposed bores and a shaft rotatably mounted within said bores, an off-set disc longitudinally spaced apart from and rigidly affixed to said shaft and rotatable to present the periphery of the disc into and out of sealing relationship with the sealing surface of an inflatable seal secured in a retaining means disposed upon the inner wall of said valve body, the improvement comprising:
 a. a continuous, integral inflatable seal having a convex sealing surface when inflated, and arcuate, inwardly concave, sides disposed intermediate
 b. a pair of annular retaining rings disposed in parallel spaced-apart relationship upon said inner wall, said rings having opposed inside surfaces adapted to contact and frictionally secure said arcuate sides of said seal, and
 c. means for inflating said seal to a internal seal pressure in excess of the pressure of said gas to effect a bubble-tight seal between said periphery of the disc and said convex sealing surface of the inflated seal.

2. The combination of claim 1 wherein said rings comprise rods welded to said inner wall and the rings on the upstream side of said flow of gas is continuously welded to said inner wall, and the distance between the inner edges of said rings is less than the width of the base of said continuous integral inflatable seal.

3. The combination of claim 1 wherein the height of each said ring is less than the height of said seal in uninflated condition.

4. The combination of claim 1 wherein said internal seal pressure is less than about 100 psig and said pressure of said gas is less than about 25 psig.

5. The combination of claim 1 including operator means for rotating said shaft and disc from an open position to a closed position, or vice versa, and automatically pressurizing and depressurizing said seal, as desired.

6. The combination of claim 1 wherein said inflatable seal is removably secured intermediate said retaining means.

* * * * *